Patented Nov. 27, 1923.

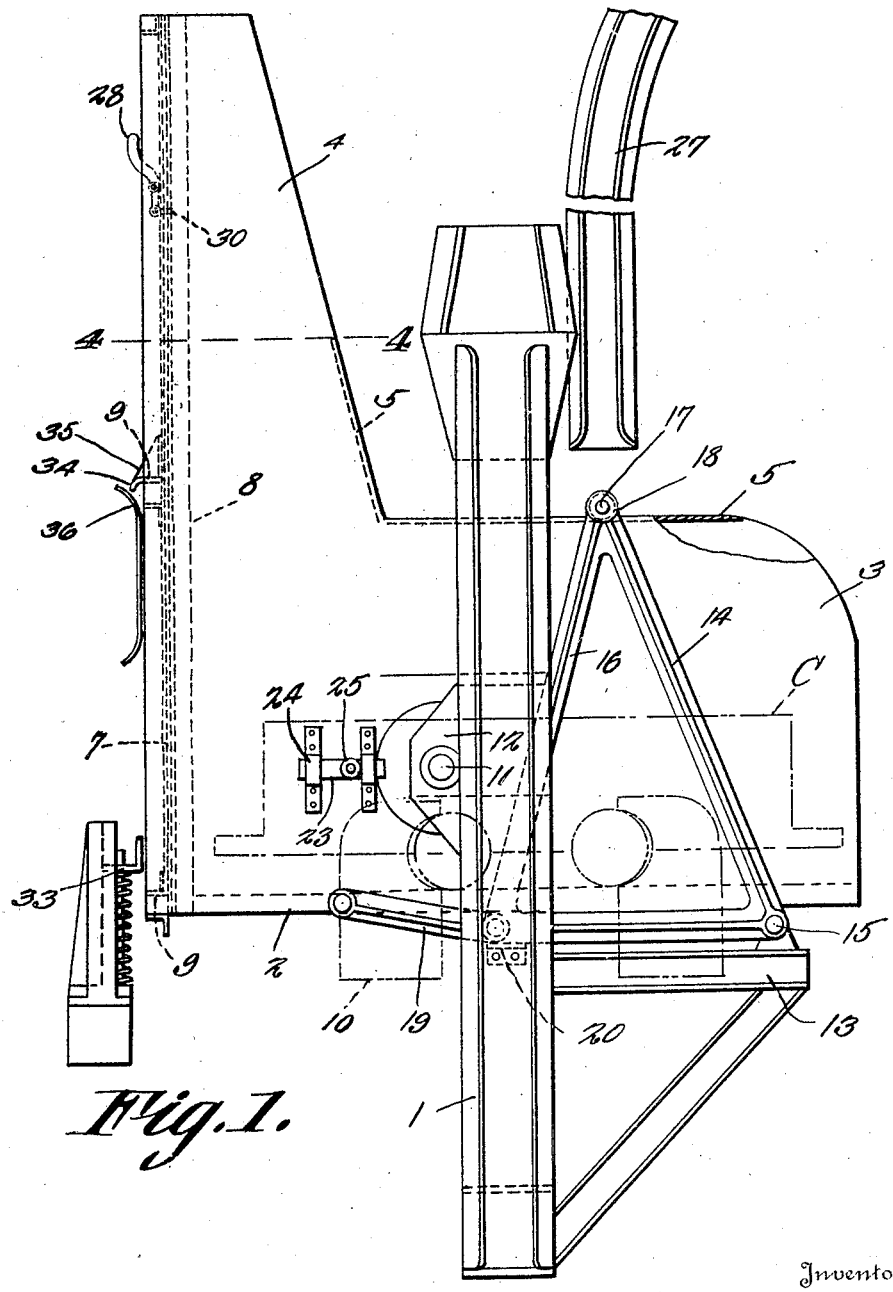

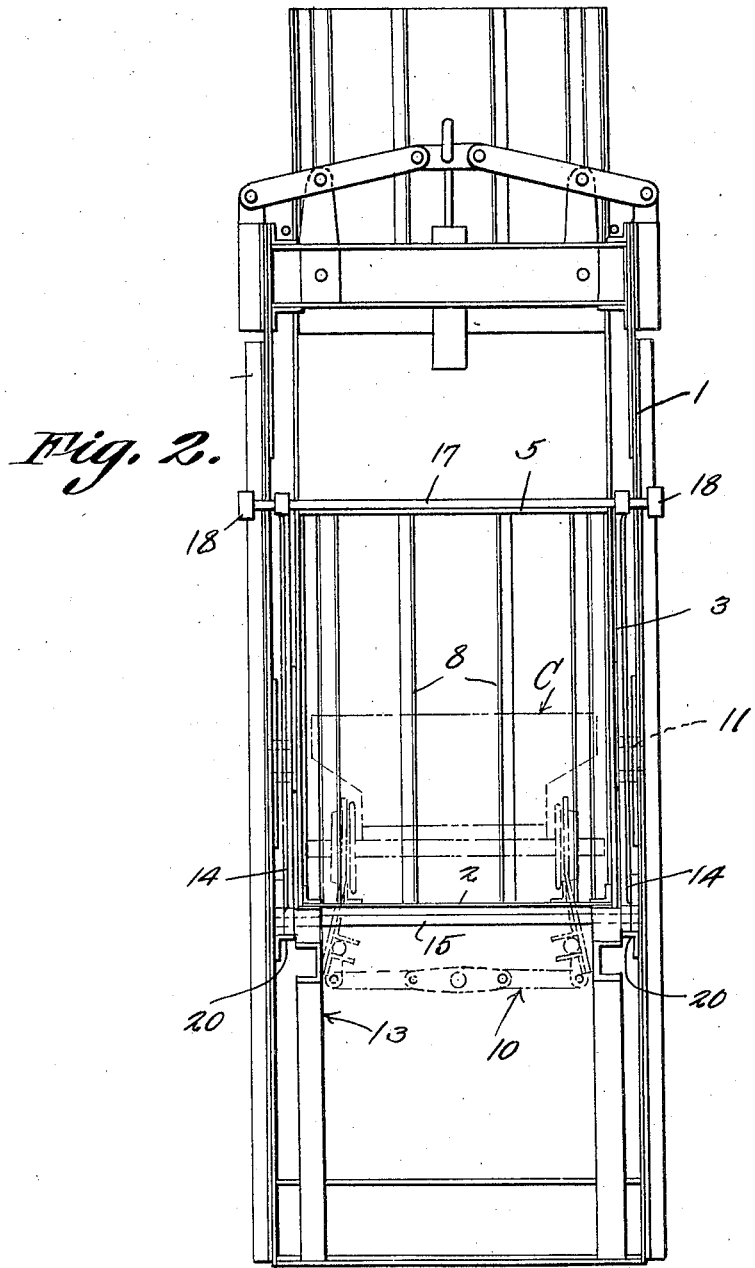

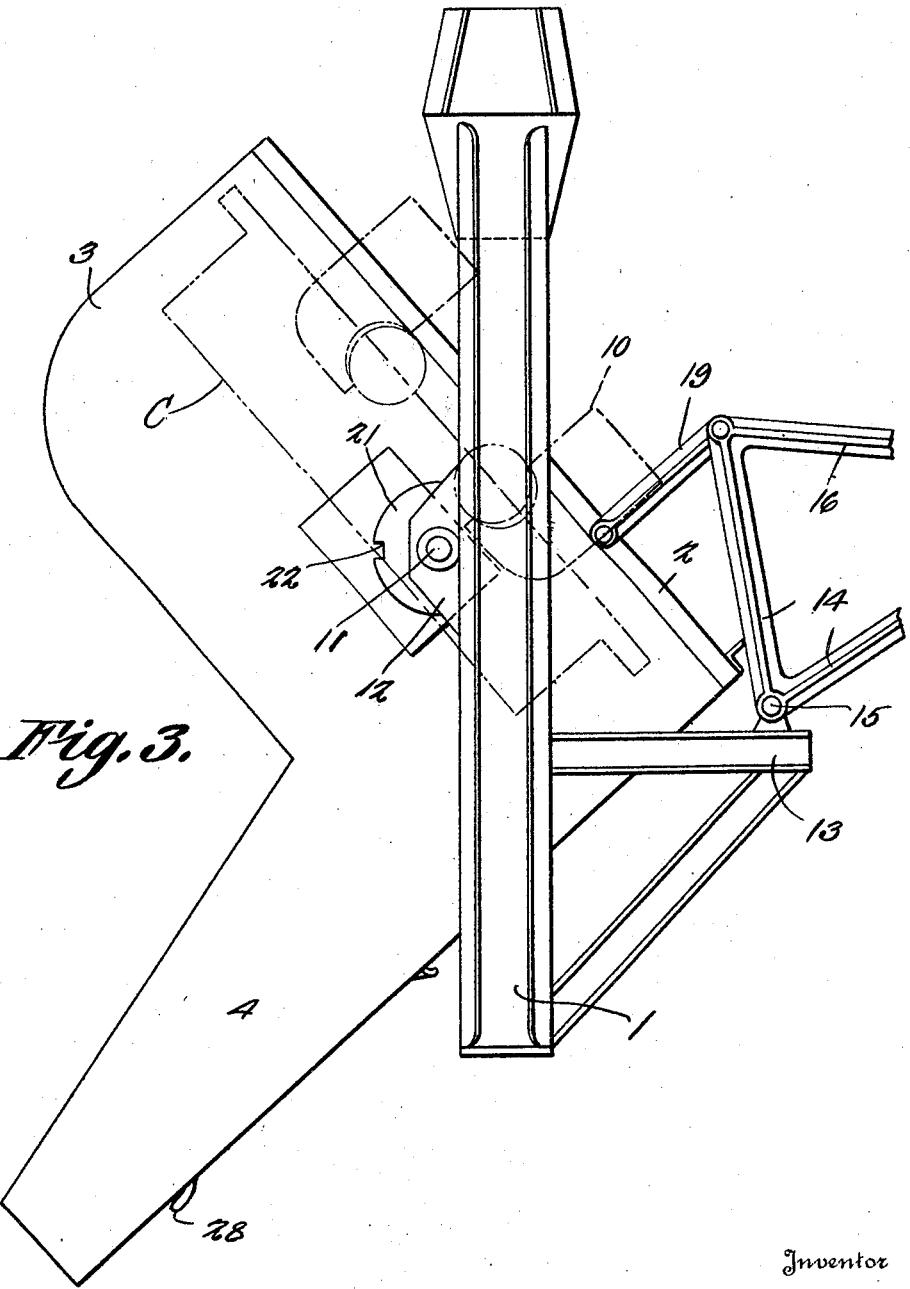

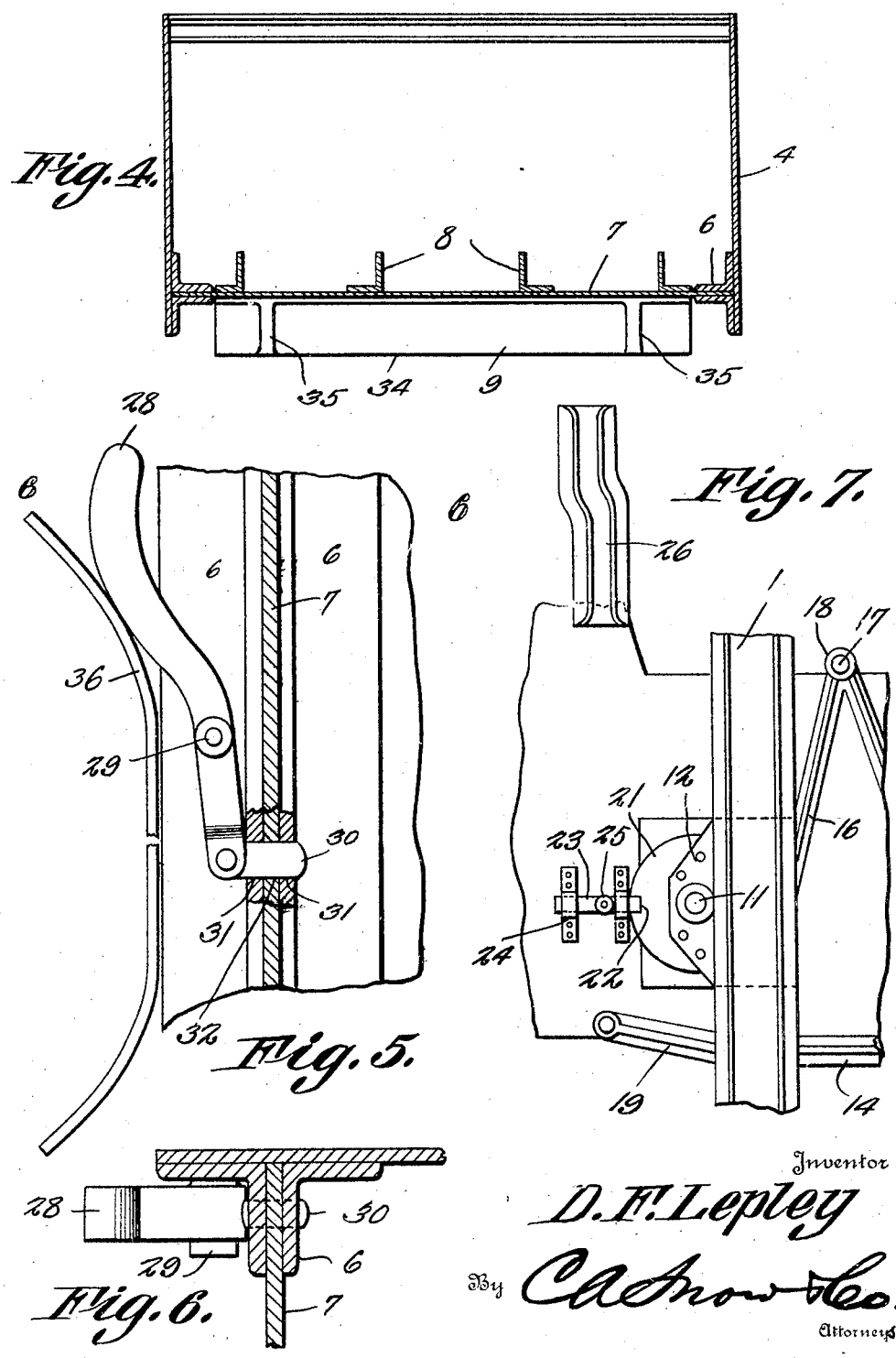

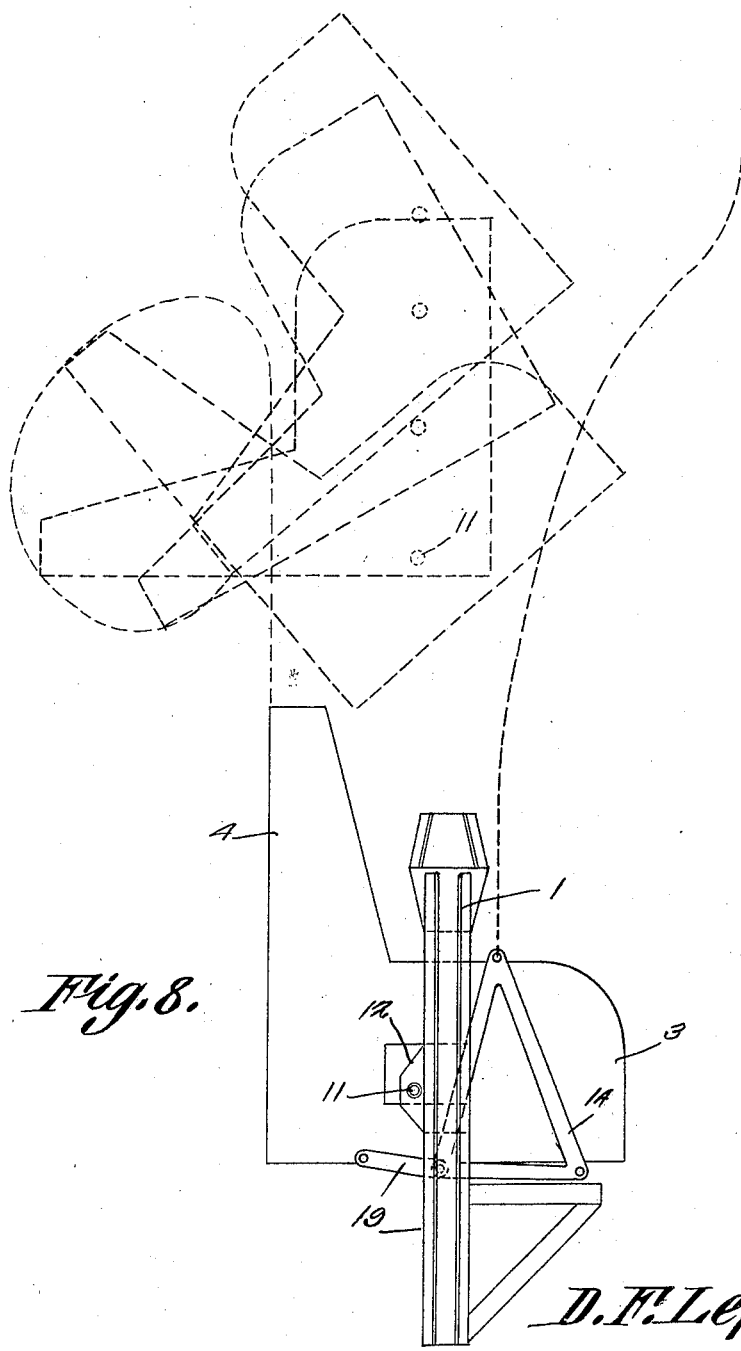

1,475,636

UNITED STATES PATENT OFFICE.

DANIEL F. LEPLEY, OF CONNELLSVILLE, PENNSYLVANIA.

OVERTURNING CAGE.

Application filed November 7, 1921. Serial No. 513,372.

*To all whom it may concern:*

Be it known that I, DANIEL F. LEPLEY, a citizen of the United States, residing at Connellsville, in the county of Fayette and State of Pennsylvania, have invented a new and useful Overturning Cage, of which the following is a specification.

This invention relates to overturning cages for use in mines.

One of the objects of the invention is to provide a cage designed to receive a car from either end, this cage being formed with an integral extension or chute which is normally upstanding but which is adapted, when the cage is overturned, to receive the material delivered from the caged car and direct it into a stationary chute provided therefor.

Another object is to provide means whereby as the cage approaches the upper limit of its movement it will be automatically overturned, thereby to bring its outlet spout or chute to delivering position and at the same time expelling the contents of the car into said spout or chute.

Another object is to provide an overturning cage so constructed as to allow a car to be admitted thereto from either end without impairing the efficiency of the cage as a means for delivering material to a stationary chute.

A still further object is to provide means for automatically opening and closing the chute end of the cage while the cage is in operation, said cage including a part movable relative to the cage platform and which constitutes both an end wall and door for the cage when in upright position, and a bottom for the delivery chute when the cage is in overturned position.

Another object is to provide efficient means for locking said movable member so that it cannot become displaced while the cage is overturned.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings:

Figure 1 is a side elevation of the cage in its normal or upright position, a portion being broken away.

Figure 2 is an elevation of the device viewed from the right of Figure 1.

Figure 3 is a side elevation showing the cage overturned.

Figure 4 is a section on line 4—4, Figure 1.

Figure 5 is an enlarged section through a portion of the cage chute or extension and showing the means for locking the sliding member against movement.

Figure 6 is a section on line 6—6, Figure 5, the latch lever being shown in plan.

Figure 7 is an enlarged side elevation of a portion of the cage and showing the lock employed for fastening the cage against accidental overturning.

Figure 8 is a diagram illustrating the movement of the cage while travelling from upright to overturned position.

Referring to the figures by characters of reference 1 designates the usual bail or frame of the cage and mounted therein is an overturning cage including a platform 2 having upstanding side walls 3 formed with extensions 4, these extensions constituting the side wall of the delivery chute or spout. The side walls are connected at the top by a cover plate 5 and this plate also extends for a certain distance toward the free end of the delivery spout and connects the side walls thereof as shown in Figure 1. The guide strips 6 are secured to the inner sides of the walls of the extension or chute 4 at the outer edges thereof and are slidably engaged by the sides of a plate 7 which can be reenforced by longitudinal strips 8 secured upon the inner surface thereof and by transverse strips 9 secured to the outer surface thereof. This plate forms the end wall of the cage and extends down to the platform 2. It also constitutes a sliding door which, when raised, will allow a car to pass under the door while moving on or off of the cage.

The cage is provided with suitable means indicated generally at 10 for securing a car C to the cage so that when the cage is overturned the car will not become displaced but will overturn therewith. Trunnions 11 are extended from the side walls of the cage and are journaled in suitable bearings provided therefor on the bail 1, as shown at 12.

A structure 13 is extended from the bail below the cage and is fixed relative to the bail. On this structure a bell crank 14 is fulcrumed as shown at 15, said bell crank being reenforced by a brace 16 connecting the arms of the bell crank. The upwardly extending arm of the bell crank provides a bearing for a shaft 17 which extends over the top of the cage. It is to be understood that one of these bell cranks is provided at each side of the cage and that the shaft is journaled in both of them. Wheels 18 are mounted on the ends of the shaft. Links 19 connect the lower arms of the bell cranks to the sides of the platform 2 and the parts are so positioned and proportioned that when the cage is in its normal position with its platform 2 horizontal the point of connection between each link 19 and its bell crank will be below the dead center, each bell crank will rest upon a stop bracket 20 on the bail, and the shaft 17 will bear upon the top of the cage. With the parts thus located it will be obvious that the cage will be locked against accidental overturning but as a further safeguard a segment 21 can be secured to one side of the bail and provided with a notch 22. A bolt 23 is slidably mounted on the cage within suitable guides 24 and is adapted normally to project into the notch 22 as shown in Figure 7. This bolt has a roller 25 extending laterally therefrom. A cam rail 26 is fixedly mounted in the path of the roller 25 and is so located that immediately prior to the tilting of the cage as it approaches the upper limit of its movement, the roller 25 will enter into engagement with the cam rail and be shifted thereby out of engagement with the segment 21, said roller passing from the cam rail just prior to the tilting operation which will be hereinafter described. Fixedly mounted in the paths of the wheels 18 at the upper limit of movement of the cage are cam rails 27. These rails are so proportioned and shaped that as the cage approaches the upper limit of its movement and immediately following the retraction of the bolt 23 the wheels 18 will enter into engagement with the cam rails 27 and the bell cranks 14 will be swung laterally on their fulcrums 15. Thus the links 19 will pull upon the sides of the platform 2 and cause the cage to swing bodily within the bail 1 as indicated by dotted lines in Figure 8 until the outer end of the extension or chute 4 is brought to position above a stationary chute S located at one side of the path of the cage, as shown in Figure 3. Thus the car fastened within the cage will be overturned and the contents thereof will gravitate onto the top 5 and thence onto the plate 7 along which they will slide to the stationary chute S. When the cage begins its downward movement the action of the parts will be reversed by the travel of the wheels 18 along the cam rails 27 and the cage will thus be restored to its upright position and secured by the movement of the bell crank downwardly past the dead centers and against the stop brackets 20. During the downward movement the wheel 25 will also travel within or along the cam rail 26 and cause the bolt to be projected into the notch 22.

For the purpose of preventing the plate 7 from sliding out of position while the cage is overturned, a fastening means such as shown in detail in Figures 5 and 6 is employed. This fastening means includes a lever 28 fulcrumed on a stud 29 and having a bolt 30 pivotally connected to the lower or short arm of the lever. Registering openings 31 are formed in the guides 6 adjacent the lever and another opening 32 is formed in the plate 7 and is adapted to register with these openings 31 when the plate is in its normal position. Thus the bolt 30 can be seated in all of the openings. The upper or long arm of the lever 28 is extended outwardly from between the walls of the cage and constitutes a weight for holding the bolt 30 normally projected into the openings 31 and 32. Thus it will be seen that the bolt 30 will be held in fastening position while the cage is moving vertically and also while it is overturning.

The plate 7, as heretofore stated, constitutes a sliding door for the cage and is adapted to be opened automatically when the cage approaches the lower limit of its movement, thereby to allow a car to be moved onto or off of the cage by passing under the door. To effect this automatic opening of the door there is provided at a point near the bottom of the shaft a yieldingly supported buffer or stop 33 which can be of any desired construction and which is adapted to be engaged by one of the reenforcing strips 9 just before the cage reaches its lower terminus. The strip 9 provided for this purpose is preferably formed with an extended downturned lip 34 and can be suitably braced by means of stiffening ribs 35. Just prior to the engagement of the strip 9 with the stop 33 the projecting portion of the lever 28 comes against a deflecting rail 36 fixedly mounted in the path thereof. Consequently lever 28 will be shifted to withdraw the bolt 30 from the opening 32 and immediately thereafter the strip 9 will come against the stop 33 and will hold the plate 9 against further downward movement while the balance of the cage continues to move downwardly to the loading or unloading level. Thus cars can be moved under the raised door to and from the cage. When the cage starts upwardly the door remains stationary until the platform reaches the lower edge of the door whereupon the door will be lifted from engagement with the stop 33 and will move with the cage. Thereafter the lever 28 will move off of the deflecting lever 36 and as the openings 31 and 32 will be in alignment, the weighted released lever will shift the bolt 31 into the opening 32 and thus hold the door fastened until the cage again returns to the lower level.

What is claimed is:—

1. The combination with a bail, of a cage tiltably mounted therein and having an integral delivery spout normally extending upwardly therefrom, means for holding the cage against tilting movement, and cooperating fixed and movable means for positively shifting the holding means to release the cage and overturn it within the bail to bring the spout to outwardly and downwardly inclined position.

2. The combination with a bail, of a cage tiltably mounted therein, a delivery spout extending upwardly from one end of the cage and fixed relative thereto, a member movably connected to the cage and constituting one end wall thereof, means for automatically overturning the cage relative to the bail during a portion of the movement of the cage with the bail, and means for holding said member against movement relative to the cage while the cage is overturned, said member constituting the bottom of the chute when the cage is overturned.

3. The combination with a bail, of a cage tiltably mounted therein and movable therewith, an integral upwardly projecting extension at one end of the cage constituting a chute, a member movably connected to the cage and constituting an end wall thereof, means for fastening said member against movement, means for automatically overturning the cage during its movement in one direction with the bail, thereby to position the chute in outwardly and downwardly inclined relation to the bail to deliver the contents of the cage by gravity, and means for automatically releasing said movable member during the movement of the cage in the opposite direction with the bail.

4. The combination with a bail, of a cage tiltably mounted therein and movable therewith, an integral extension at one end of the cage and normally projecting upwardly, said extension constituting a delivery chute, a member movably connected to the cage and extension and constituting an end wall of the cage, means for normally securing the member against movement relative to the cage, means for automatically overturning the cage relative to the bail during the movement of the bail in one direction, thereby to bring the chute to an outwardly and downwardly inclined position, and means for automatically releasing said member during the movement of the bail in the opposite direction.

5. The combination with a movable bail, of a tiltable cage carried thereby, an extension at one end of the cage and normally extending upwardly, a member movably connected to the cage and constituting an end wall thereof and a wall of the extension, means for automatically overturning the cage during its movement in one direction to bring the extension to a downwardly and outwardly inclined position to constitute a delivery chute, means for automatically fastening said member against movement relative to the cage, means for automatically unfastening said member during the movement of the cage in one direction, and means for automatically shifting said member to open one end of the cage when the cage approaches one limit of its movement.

6. The combination with a bail, of a cage tiltably mounted therein, an extension upon one end of the cage and normally extending upwardly, said extension constituting a delivery chute, a cam rail adjacent the path of the cage, means movable with the cage for holding the cage against tilting, and means movable with the bail and cage and cooperating with the cam rail to release the cage from its holding means and positively overturn the cage during a portion of the movement of the bail thereby to bring the chute to a downwardly inclined or delivering position.

7. The combination with a movable bail, of a cage tiltably mounted therein, an extension upon one end of the cage and normally extending upwardly, said extension constituting a delivery chute, a cam rail adjacent the path of the cage, and means movable with the bail and cage and cooperating with the cam rail to overturn the cage during a portion of the movement of the bail and bring the chute to a downwardly inclined or delivering position, said means including a lever carried by the bail, a link connection between the lever and the cage, and means on the lever for engaging the rail to actuate the lever, said link and lever cooperating normally to form a lock for the cage.

8. The combination with a movable bail and an overturning cage carried thereby, an extension upon the cage at one end and projecting upwardly when the cage is in normal position, said extension constituting a delivery chute when the cage is overturned, a movable member constituting an end wall for the cage and the bottom of the delivery chute, means for fastening said member normally against movement relative to the cage, cushioning means for stopping the downward movement of the member while the cage is approaching the lower limit of its movement, thereby to open the cage to permit movement of a car under the member, and means for unlocking said member prior to the opening of the cage.

9. An overturning cage having an integral extension at one end thereof adapted normally to project upwardly, said extension constituting a delivery chute when the cage is overturned, said cage being closed at the top and a portion of the chute being closed along the top thereby to prevent spilling of the contents of the cage while overturning.

10. An overturning cage having an extension at one end normally projecting upwardly and constituting a delivery chute when the cage is overturned, a member slidably connected to the cage and constituting an end wall thereof and the bottom of the delivery chute, means for securing said member normally against movement relative to the cage, means for unlocking the member, and means for stopping the movement of the member in one direction during the completion of the movement of the cage in said direction, thereby to open that end of the cage normally closed by the member.

11. A cage for hoisting cars loaded with materials, means for holding a car on the cage, means for overturning the cage and car to dump the materials into what is normally one end portion of the top of the cage, a cover on the cage for preventing spilling of the contents of the cage and for deflecting materials toward said end portion of the top during the overturning operation, and means for discharging said materials from said end portion of the top into an adjacent receiving chute.

In testimony that I claim the foregoing as my own, I have hereto affixed my signature in the presence of two witnesses.

DANIEL F. LEPLEY.

Witnesses:
 W. H. SOISSON,
 ANNA KATE HARRIS.